United States Patent
Edlund

(10) Patent No.: US 9,011,580 B2
(45) Date of Patent: Apr. 21, 2015

(54) HYDROGEN PURIFIER

(75) Inventor: David Edlund, Bend, OR (US)

(73) Assignee: Azur Energy LLC, La Verne, CA (US)

( * ) Notice: Subject to any disclaimer, the term of this patent is extended or adjusted under 35 U.S.C. 154(b) by 63 days.

(21) Appl. No.: 13/988,006

(22) PCT Filed: Nov. 17, 2010

(86) PCT No.: PCT/US2010/057077
§ 371 (c)(1),
(2), (4) Date: May 16, 2013

(87) PCT Pub. No.: WO2012/067612
PCT Pub. Date: May 24, 2012

(65) Prior Publication Data
US 2013/0239812 A1    Sep. 19, 2013

(51) Int. Cl.
| | | |
|---|---|---|
| *B01D 53/22* | (2006.01) | |
| *B01D 63/08* | (2006.01) | |
| *C01B 3/50* | (2006.01) | |
| *B01D 69/14* | (2006.01) | |
| *C01B 3/32* | (2006.01) | |
| *H01M 8/06* | (2006.01) | |

(52) U.S. Cl.
CPC ............... *C01B 3/501* (2013.01); *B01D 53/22* (2013.01); *B01D 63/081* (2013.01); *B01D 69/148* (2013.01); *B01D 2313/02* (2013.01); *C01B 3/323* (2013.01); *C01B 3/505* (2013.01); *C01B 2203/0233* (2013.01); *C01B 2203/066* (2013.01); *C01B 2203/1223* (2013.01); *H01M 8/0662* (2013.01); *Y02E 60/50* (2013.01)

(58) Field of Classification Search
USPC ............. 95/45, 55, 56; 96/4, 7, 9, 11; 55/490, 55/490.1; 29/428; 423/651
See application file for complete search history.

(56) References Cited

U.S. PATENT DOCUMENTS

| | | | |
|---|---|---|---|
| 5,393,325 A * | 2/1995 | Edlund | 95/56 |
| 6,183,542 B1 | 2/2001 | Bossard | |
| 7,297,183 B2 | 11/2007 | Edlund et al. | |
| 7,396,384 B2 * | 7/2008 | Barker et al. | 95/55 |
| 7,585,355 B2 * | 9/2009 | Gonjo et al. | 96/9 |
| 8,157,900 B2 * | 4/2012 | Pledger et al. | 96/4 |
| 2004/0255782 A1 | 12/2004 | Han et al. | |
| 2006/0037476 A1 * | 2/2006 | Edlund et al. | 96/4 |
| 2009/0301307 A1 * | 12/2009 | Sugiyama et al. | 96/9 |
| 2010/0064887 A1 * | 3/2010 | Edlund et al. | 95/45 |
| 2010/0263538 A1 * | 10/2010 | DeVries | 96/9 |
| 2010/0282085 A1 * | 11/2010 | DeVries | 96/9 |

FOREIGN PATENT DOCUMENTS

JP         2005288290 A     10/2005

OTHER PUBLICATIONS

International Search Report and Written Opinion mailed Aug. 29, 2011 from International Application No. PCT/US2010/057077.

* cited by examiner

*Primary Examiner* — Jason M Greene
(74) *Attorney, Agent, or Firm* — Schwabe, Williamson & Wyatt, P.C.

(57) ABSTRACT

Techniques are generally described herein for the design and manufacture of hydrogen generation apparatuses and systems. Other embodiments may also be disclosed and claimed. Some methods described herein pressing together a first end plate, one or more intermediate plates, and a second end plate using a press to form a hydrogen purifier module, and placing a plurality of clips around the hydrogen purifier module to hold the first end plate, the one or more intermediate plates, and the second end plate together.

12 Claims, 4 Drawing Sheets

HYDROGEN PURIFIER

CROSS REFERENCE TO RELATED APPLICATIONS

The present application is a U.S. National Stage of International Patent Application No. PCT/US10/57077, filed Nov. 17, 2010, entitled "Hydrogen Purifier," the disclosure of which is hereby incorporated by reference in its entirety.

BACKGROUND

Unless otherwise indicated herein, the materials described in this section are not prior art to the claims in this application and are not admitted to be prior art by inclusion in this section.

Purified hydrogen has become a common fuel source. Fuel cells, for example, use purified hydrogen and an oxidant to produce an electrical potential. High purity hydrogen is also used extensively in industrial processing, including hydrogenation of oils and the production of ammonia. To produce purified hydrogen, a reformer and a hydrogen purifier are commonly used. In a typical arrangement, the reformer chemically converts a feedstock over a catalyst to generate impure hydrogen, and the hydrogen purifier extracts pure hydrogen from the reformate using a hydrogen-selective membrane. However, reformers are not the only sources of impure hydrogen. Ammonia crackers and electrolysis systems also produce hydrogen that requires purification prior to use in high-purity applications. Several industrial processes also produce hydrogen, which has the potential to be purified and utilized. For example, chlor-alkali processing plants produce large amounts of hydrogen in their waste gas streams. By using purification, this waste stream can become a commodity, adding value to the chemical plant.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF EMBODIMENTS

Figure 1:
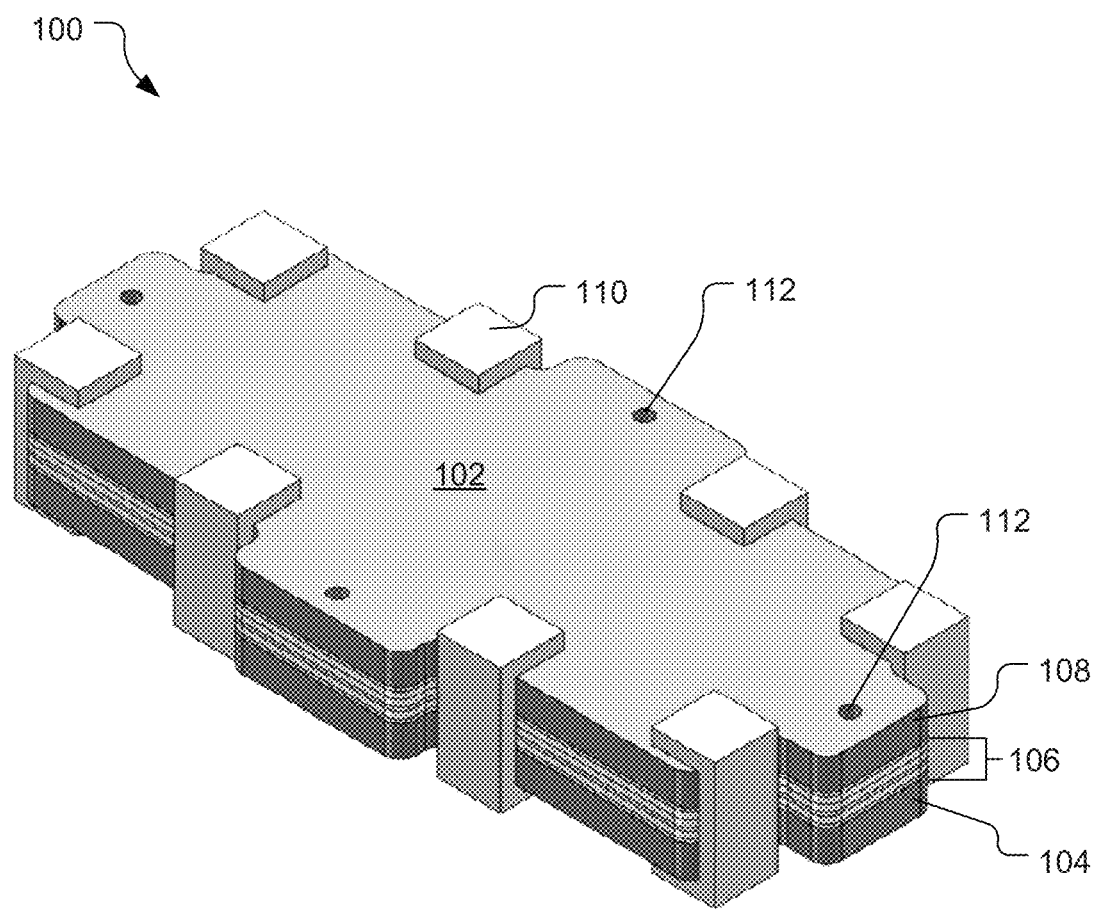
FIG. 1 is an example hydrogen purifier including clips holding the various elements together.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to hydrogen purification. Embodiments include, but are not limited to, methods, apparatuses, and systems for hydrogen purification. Other embodiments may also be disclosed and claimed.

The present disclosure recognizes various drawbacks of hydrogen purifiers having bolts holding together the various elements of the hydrogen purifier. For instance, the nature of the bolts requires these hydrogen purifiers to be on the larger size in order to accommodate the area consumed by the bolts, leading to larger and heavier hydrogen purifiers. Moreover, testing and adjustment of the compression of these hydrogen purifiers is generally performed after the elements are bolted together, with any adjustments being made by torquing the bolts to the desired compression. This may lead to increased assembly and testing time.

In contrast, the described hydrogen purifier includes clips to hold the plates of the purifier together. The clips may be coupled to the exterior surface of the plates, allowing the plates to have a smaller overall size as compared to bolted purifiers. To assemble the hydrogen purifier, the plates and other elements (for example, foils, foil backing materials, gaskets, etc.) may be loaded onto a press and pressed together. The hydrogen purifier may be tested and adjusted while the elements are being pressed together, before clipping the elements together. Testing the purifier on the press may allow for correction of any issues that may have occurred during the build-up of the purifier. The hydrogen purifier may then be ready for operation once it is removed from the press.

FIG. 1 is an example hydrogen purifier 100, arranged in accordance with at least some embodiments of the present disclosure. A basic configuration of the purifier 100 may include a hydrogen purifier module 102 including a first end plate 104, one or more intermediate plates 106, and a second end plate 108. Clips 110 may hold the hydrogen purifier module 102 together. In various embodiments, the clips 110 may be further welded in place.

Figure 2:
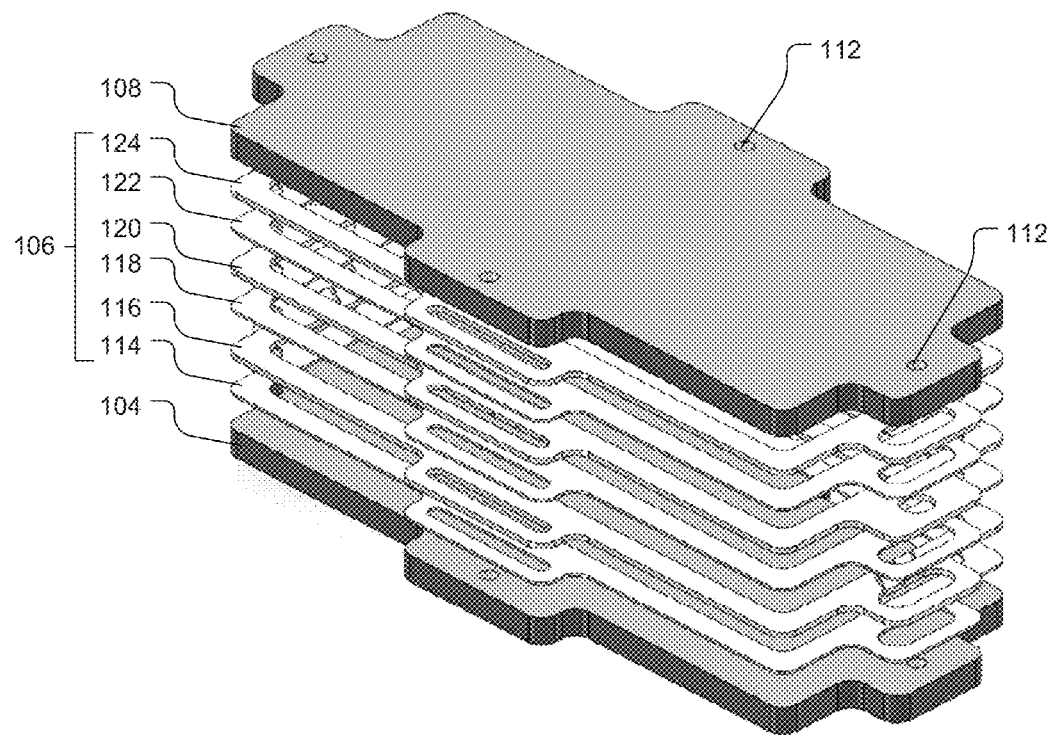
FIG. 2 is an exploded view of some of the elements of the hydrogen purifier of FIG. 1.

An exploded view of some of the elements of the hydrogen purifier 100 is illustrated in FIG. 2. For clarity and to avoid redundancy, elements that are similar to the elements discussed herein with respect to FIG. 1 are noted in the remaining Figures using the same reference numerals.

The one or more intermediate plates 106 may be configured to support one or more hydrogen-permeable and/or hydrogen-selective membranes (not illustrated) for purifying hydrogen. The membranes may be formed of any hydrogen-permeable and/or hydrogen-selective material suitable for use in the operating environment and parameters in which hydrogen purifier 100 is operated. Examples of suitable materials for the membranes include palladium and palladium alloys, and especially thin films of such metals and metal alloys. Palladium alloys have proven particularly effective, especially palladium with 35 wt % to 45 wt % copper. These membranes are typically formed from a thin foil that is approximately 0.001 inches thick. It is within the scope of the present disclosure, however, that the membranes may be formed from hydrogen-permeable and/or hydrogen-selective materials, including metals and metal alloys other than those discussed above as well as non-metallic materials and compositions, and that the membranes may have thicknesses that are greater or less than discussed above.

The one or more intermediate plates 106 may include one or more feed plates 116, 124 thin plates 114, 118, 122, and/or permeate plates 120, and other plates as needed, and may be formed any material suitable for the purpose. It is within the scope of the disclosure that the various plates 104, 108, 114, 116, 118, 120, 122, 124 discussed herein do not all need to be formed from the same materials and/or the plates 104, 108, 114, 116, 118, 120, 122, 124 need not have the exact same dimensions, such as the same thicknesses. For example, the permeate plate 120 and feed plates 116, 124 may be formed from stainless steel or another suitable structural member, while the other plates may be formed from a different material, such as copper, alloys thereof, and other materials.

Although not illustrated, the hydrogen purifier 100 may further include one or more gaskets or sealing members interconnecting or spanning one or more of the surfaces of one or more of the plates 104, 106, 108 to be joined to enhance the leak-resistance of the hydrogen purifier 100. The gasket may be selected to reduce or eliminate leaks when used at the operating parameters and under the operating conditions of the hydrogen purifier 100. In various embodiments, therefore, high-pressure and/or high-temperature seals may be selected. An illustrative, non-exclusive example of such a gasket or sealing member may be a graphite gasket.

In various embodiments, the hydrogen purifier 100 may be configured to perform optimally at temperatures between 150° C. and 450° C., but the purification process is thermally neutral—meaning that thermal energy is neither consumed nor generated by the process.

As illustrated, the hydrogen purifier 100 has no moving parts and is inherently robust, and may deliver >99.95% pure product hydrogen. If reformate is the feed stream to be purified, the concentration of carbon monoxide in the product hydrogen stream may be <1 ppm. This level of hydrogen purity is more than adequate for proton exchange membrane fuel cell (PEMFC) applications.

Figure 3:
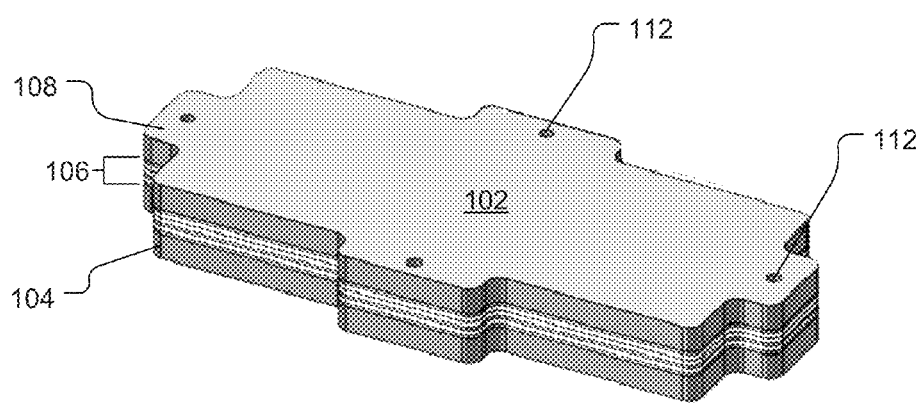
FIG. 3 is the hydrogen purifier of FIG. 1 without the clips.

To construct the hydrogen purifier 100, the one or more intermediate plates 106 may be disposed between the first end plate 104 and the second end plate 108, and placed onto a press (such as a shop press) to form the hydrogen purifier module 102 illustrated in FIG. 3. The first end plate, the one or more intermediate plates, and the second end plate may be aligned using one or more alignment pins, and then pressed together using the press.

The hydrogen purifier module 102 may then be tested while it is still on the press. The testing may be performed to insure that the purifier is free of leaks and that it performs as expected for the application for which it is being built.

Once the hydrogen purifier module 102 has been tested and determined to have the desired characteristics, the plurality of clips 110 may be coupled to the hydrogen purifier module 102 to form the hydrogen purifier 100. In various embodiments, the clips 110 may be welded into place.

Figure 4:
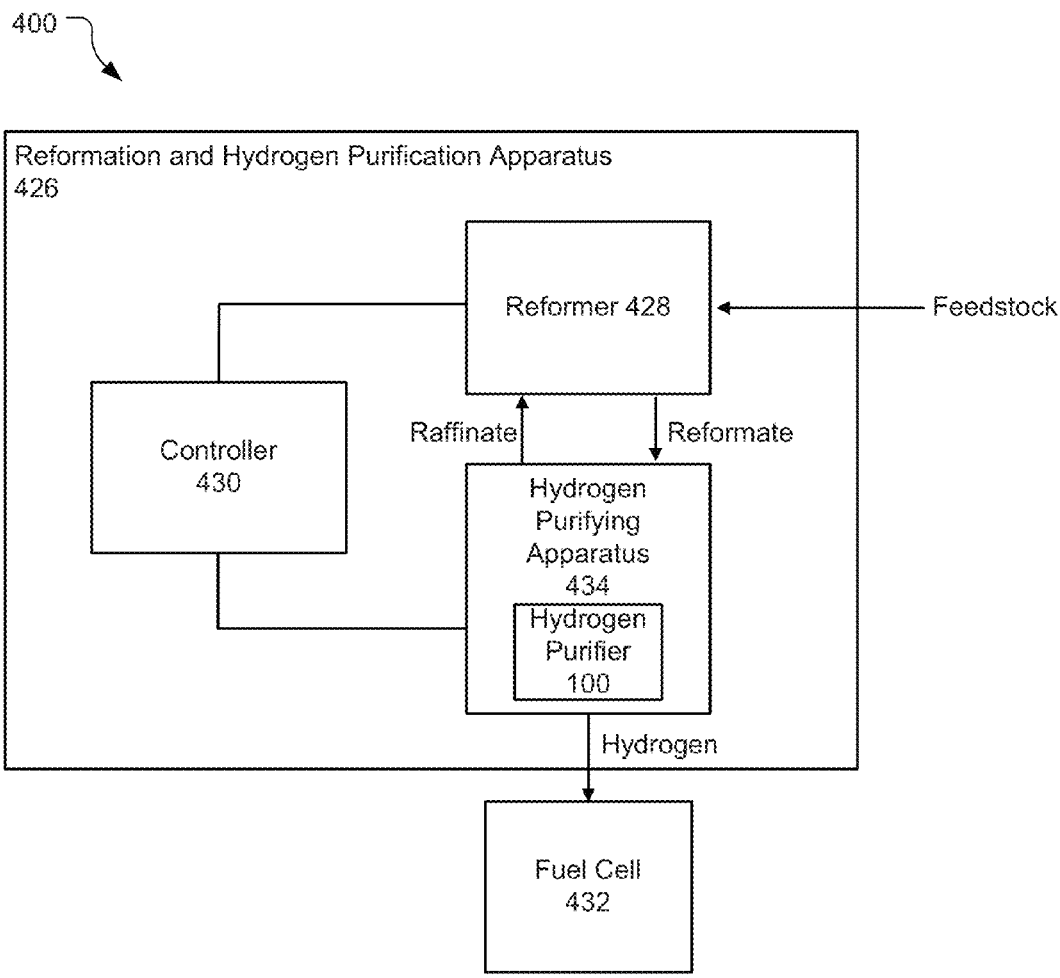
FIG. 4 is a block diagram of an example reformation and hydrogen purification system; all arranged in accordance with various embodiments of the present disclosure.

FIG. 4 is a block diagram of an example system 400 including a reformation and hydrogen purification apparatus 426, arranged in accordance with at least some embodiments of the present disclosure. A basic configuration of the apparatus 426 may include a reformer 428, a hydrogen purifying apparatus 434 including a hydrogen purifier 100 (as described herein), and a controller 430, all coupled together and generally configured as illustrated.

In general, the reformer 428 may be configured to receive feedstock, reform the feedstock, and provide the reformate stream to the hydrogen purifier 100 of the hydrogen purifying apparatus 434. The hydrogen purifier 100 may be configured to purify the reformate to obtain hydrogen, and provide the hydrogen to a fuel cell 432, which may be configured to produce an electrical potential for application to an electrical load (not illustrated). The hydrogen purifying apparatus 434 may be further configured to route any hydrogen-depleted gas back to the reformer 428 as fuel for heating the reformer 428.

As noted, the reformer 428 may be configured to vaporize and reform a liquid feedstock. To that end, the reformer 428 may include a reforming catalyst adapted to react with the vaporized feedstock to produce hydrogen. The liquid feed may comprise any suitable liquid feedstock such as methanol and water. Other alcohols and hydrocarbons, however, plus water may be similarly suitable. Pressurized feedstock may be provided to the reformer 428 at its inlet line, and the pressurized feedstock may be vaporized by a vaporizer coil. The vaporized feedstock may then flow into the annular reformer where it chemically reacts over the catalyst to produce hydrogen, and usually, various byproducts (sometimes collectively referred to herein as reformate). For embodiments in which the feedstock is methanol and water, for example, the reaction is ideally represented as:

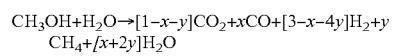

$$CH_3OH+H_2O \rightarrow [1-x-y]CO_2+xCO+[3-x-4y]H_2+y CH_4+[x+2y]H_2O$$

wherein $CO_2$, $CO$, $H_2O$ and $CH_4$ are the non-hydrogen byproducts.

The reformate may then provided to the hydrogen purifier 100 of the hydrogen purifying apparatus 434. The hydrogen purifier 100 may be configured as described herein with respect to FIGS. 1-3, in which clips, such as clips 110, hold the various plates 104, 106, 108 and other elements together. In an example configuration, the hydrogen purifier 100 may include a catalyst (e.g., palladium alloy foil, etc.) that allows the hydrogen ($H_2$) to dissolve into very pure atomic hydrogen ($H^+$). In various embodiments, the resulting hydrogen may contain less than 1 ppm CO.

The reformation and hydrogen purification apparatus 426 may then output the purified hydrogen. In various embodiments, the reformation and hydrogen purification apparatus 426 may be coupled to a fuel cell such as the fuel cell 432.

The controller 430 may be any device suitable for monitoring, adjusting, and/or controlling a process of reformation and/or hydrogen purification according to the various methods described herein. For example, the controller 430 may be a computing device (e.g., a computer system, a microprocessor, a microcontroller, a programmable logic circuit, etc.), an embedded controller (e.g., an Application Specific Integrated Circuit (ASIC), or some other equivalent), or a non-microprocessor-based controller (e.g., relay circuit, etc.).

As the system 400 may experience temperature extremes (both hot and cold) and varying humidity levels, non-microprocessor-based controllers may be particularly advantageous, especially where reliability and cost may be important design factors. In contrast to microprocessor-based controllers, glitches and code issues, as well as susceptibility to electromagnetic radiation (e.g., radio and microwave radiation), may be avoided with non-microprocessor-based controllers.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for making a hydrogen purifier apparatus, comprising:
   disposing one or more intermediate plates on a first end plate;
   disposing a second end plate on the one or more intermediate plates;
   pressing together the first end plate, the one or more intermediate plates, and the second end plate using a press to form a hydrogen purifier module; and
   placing a plurality of clips around the hydrogen purifier module to hold the first end plate, the one or more intermediate plates, and the second end plate together, wherein the one or more intermediate plates include a feed plate and a permeate plate and wherein the permeate plate includes a hydrogen-permeable membrane or a hydrogen-selective membrane.

2. The method of claim 1, further comprising aligning the first end plate, the one or more intermediate plates, and the second end plate using one or more alignment pins prior to the pressing.

3. The method of claim 1, further comprising welding the plurality of clips onto the hydrogen purifier module.

4. The method of claim 1, wherein the permeate plate includes the hydrogen-selective membrane and the hydrogen-selective membrane comprises a palladium-alloy foil.

5. The method of claim 1, further comprising testing the hydrogen purifier module after the pressing.

6. The method of claim 5, wherein the testing is performed before placing the plurality of clips around the hydrogen purifier module.

7. A hydrogen purifying apparatus comprising:
   a first end plate;
   one or more intermediate plates on the first end plate;
   a second end plate on the one or more intermediate plates such that the one or more intermediate plates is between the first end plate and the second end plate; and
   a plurality of clips holding the first end plate, the one or more intermediate plates, and the second end plate together, wherein the one or more intermediate plates include a feed plate and a permeate plate and wherein the permeate plate includes a hydrogen-permeable membrane or a hydrogen-selective membrane.

8. The apparatus of claim 7, wherein the plurality of clips are welded onto the first end plate, the one or more intermediate plates, and the second end plate.

9. The apparatus of claim 7, wherein the permeate plate includes the hydrogen-selective membrane and the hydrogen-selective membrane comprises a palladium-alloy foil.

10. A reformation and hydrogen purification system comprising:
- a reformer configured to vaporize a feedstock and generate a reformate;
- a hydrogen purifier configured to receive the reformate from the reformer and to produce purified hydrogen and a raffinate from the reformate, wherein the hydrogen purifier includes:
- a first end plate;
- one or more intermediate plates on the first end plate;
- a second end plate on the one or more intermediate plates such that the one or more intermediate plates is between the first end plate and the second end plate;
- a plurality of clips holding the first end plate, the one or more intermediate plates, and the second end plate together, wherein the one or more intermediate plates include a feed plate and a permeate plate and wherein the permeate plate includes a hydrogen-permeable membrane or a hydrogen-selective membrane; and
- an insulated chamber housing the reformer and the hydrogen purifier.

11. The system of claim 10, wherein the plurality of clips are welded onto the first end plate, the one or more intermediate plates, and the second end plate.

12. The system of claim 10, wherein the permeate plate includes the hydrogen-selective membrane and the hydrogen-selective membrane comprises a palladium-alloy foil.

\* \* \* \* \*